United States Patent
Dadej et al.

(10) Patent No.: US 12,457,989 B2
(45) Date of Patent: Nov. 4, 2025

(54) MILKING ARRANGEMENT COMPRISING A CLEANING ARRANGEMENT

(71) Applicant: DELAVAL HOLDING AB, Tumba (SE)

(72) Inventors: Marek Dadej, Tumba (SE); Sebastian Zmarzly, Tumba (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 17/924,632

(22) PCT Filed: May 11, 2021

(86) PCT No.: PCT/SE2021/050449
§ 371 (c)(1),
(2) Date: Nov. 10, 2022

(87) PCT Pub. No.: WO2021/230798
PCT Pub. Date: Nov. 18, 2021

(65) Prior Publication Data
US 2023/0172152 A1    Jun. 8, 2023

(30) Foreign Application Priority Data
May 13, 2020    (SE) .................................. 2050560-8

(51) Int. Cl.
*A01J 7/02*    (2006.01)
*A01J 5/007*   (2006.01)
*A01J 5/04*    (2006.01)

(52) U.S. Cl.
CPC .............. *A01J 5/007* (2013.01); *A01J 5/044* (2013.01); *A01J 5/048* (2013.01); *A01J 7/022* (2013.01)

(58) Field of Classification Search
CPC .. A01J 5/007; A01J 7/022; A01J 5/048; A01J 5/044; A01J 7/02; A01J 7/04; A01J 7/025; A01J 7/027
See application file for complete search history.

(56) References Cited

U.S. PATENT DOCUMENTS

| | | | |
|---|---|---|---|
| 5,245,946 | A | 9/1993 | Hoefelmayr et al. |
| 5,896,828 | A | 4/1999 | Kronschnabel et al. |

(Continued)

FOREIGN PATENT DOCUMENTS

| | | |
|---|---|---|
| GB | 2475249 | 5/2011 |
| JP | 2012-005421 | 1/2012 |

(Continued)

OTHER PUBLICATIONS

International Search Report dated Jul. 9, 2021, for PCT/SE2021/050449, 5 pp.

(Continued)

*Primary Examiner* — Peter M Poon
*Assistant Examiner* — Carly W. Lynch
(74) *Attorney, Agent, or Firm* — NIXON & VANDERHYE

(57) ABSTRACT

A milking arrangement with a plurality of milk stations connected to the milk transport line, a receiver connected to the transport line that receives milk transported from the milk stations via the transport line, and a vacuum system that supplies a vacuum in the transport line via the receiver, with a cleaning liquid source connected to the transport line, a controllable injector that introduces an amount of gas into the transport line to produce a temporary pressure increase therein that causes a slug of a cleaning liquid from the cleaning liquid source to be formed and forwarded through the transport line, and a control system configured to control the operation of the injector, wherein the control system is (Continued)

configured to control characteristics of the slug by controlling the vacuum level supplied by the vacuum system and/or the amount of gas introduced via the controllable injector.

20 Claims, 1 Drawing Sheet

(56) References Cited

U.S. PATENT DOCUMENTS

| | | | |
|---|---|---|---|
| 6,089,242 | A | 7/2000 | Buck |
| 7,607,404 | B2 * | 10/2009 | Stellnert ................. A01J 5/007 |
| | | | 119/14.08 |
| 10,258,016 | B2 * | 4/2019 | Bosma ..................... A01J 7/02 |
| 2011/0041770 | A1 * | 2/2011 | Westman ................ B08B 9/055 |
| | | | 119/14.18 |
| 2018/0290185 | A1 | 10/2018 | Sliva et al. |

FOREIGN PATENT DOCUMENTS

| | | |
|---|---|---|
| JP | 2012005963 A | 1/2012 |
| WO | 2009/029041 | 3/2009 |
| WO | 2017/091126 | 6/2017 |

OTHER PUBLICATIONS

Written Opinion of the ISA dated Jul. 9, 2021, for PCT/SE2021/050449, 7 pp.

Swedish Search Report dated Dec. 18, 2020, for SE 2050560-8, 3 pp.

Douglas J. Reinemann et al., "Two-Phase Cleaning Flow Dynamics in Air Injected Milklines", Transactions of the ASAE, 1994, vol. 37, No. 5, 15 pp.

Office Action, issued in Japanese Patent Application No. 2022-562301 dated May 30, 2025.

* cited by examiner

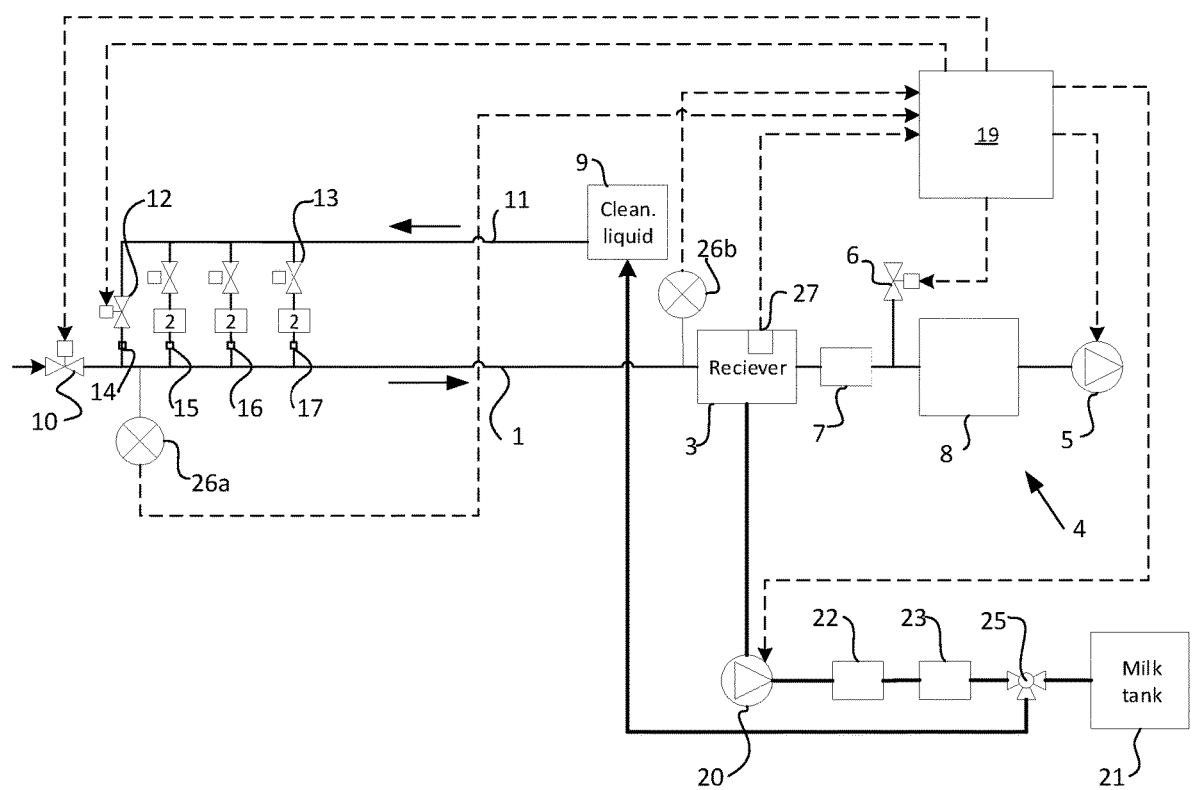

MILKING ARRANGEMENT COMPRISING A CLEANING ARRANGEMENT

CROSS-REFERENCE TO RELATED APPLICATION(S)

This application is the U.S. national phase of International Application No. PCT/SE2021/050449 filed May 11, 2021, which designated the U.S. and claims priority to SE 2050560-8 filed May 13, 2020, the entire contents of each of which are hereby incorporated by reference.

TECHNICAL FIELD

The present invention relates to a milking arrangement comprising: a milk transport line, a plurality of milk stations connected to the milk transport line, a receiver connected to the milk transport line and configured to receive milk transported from the milk stations to the receiver via the milk transport line, and a vacuum system configured to supply a vacuum in the milk transport line via the receiver, a cleaning liquid source connected to the milk transport line, a controllable injector configured to introduce an amount of gas into the milk transport line thus producing a temporary pressure increase therein which causes a slug of a cleaning liquid from the cleaning liquid source to be formed an forwarded through the milk transport line, and a control system configured to control the operation of the injector.

BACKGROUND

Milking arrangements comprise a cleaning arrangement provided for the purpose of repeatedly cleaning the milk stations, the milk transport line and components such as filters and heat exchangers provided along the milk transport line. The cleaning comprises different sequences such as pre-rinsing and main cleaning.

Milking arrangements equipped with a vacuum system for supplying a system vacuum are well known. The vacuum system may be arranged to supply vacuum to the milk transport and to the cleaning liquid transport. The cleaning system may be equipped with a controllable injector configured to introduce an amount of gas, normally atmospheric air, into the milk transport line thus producing a temporary pressure increase therein which causes a slug of a cleaning liquid from a cleaning liquid source to be formed and forwarded through the milk transport line. A slug is a column of liquid filling the cross-section of the milk transport line while traveling at high speed through the latter, driven by the vacuum. Each slug has a short length compared to the length of the milk transport line. The slugs end up in a so called receiver, which is supplied with vacuum by the vacuum system. The receiver may be connected to a pump by means of which the liquid in the receiver is pumped back to the cleaning liquid source, for the generation of further slugs. From the receiver, the milk transport line continues to a milk tank via a milk pump, filters and heat exchangers. The pump for pumping back the cleaning liquid to the cleaning liquid source may be the milk pump, and the cleaning liquid may thereby be pumped through the filters and heat exchangers in that part of the milk transport line.

According to prior art, the opening times of the injector, which affects the slug characteristics, such as initial length and speed of the slug, are set in connection to a calibration of the milking arrangement, and are then left unchanged.

However, during operation of the milk arrangement, the conditions in the milk transport line, which affect the characteristics of a slug, may change. The conditions may be the amount of liquid present in the milk transport line and/or the vacuum level in the milk transport line.

SUMMARY

The present inventors have realized the importance of being able to control the slug characteristics during a cleaning sequence, and also the importance and advantages of using different slug characteristics for different cleaning sequences.

It is an object of the present invention to present a milking arrangement which is able of controlling slug characteristics.

The object of the invention is achieved by means of a milking arrangement comprising:
 a milk transport line,
 a plurality of milk stations connected to the milk transport line,
 a receiver connected to the milk transport line and configured to receive milk transported from the milk stations to the receiver via the milk transport line, and
 a vacuum system configured to supply a vacuum in the milk transport line via the receiver,
 a cleaning liquid source connected to the milk transport line,
 a controllable injector configured to introduce an amount of gas into the milk transport line thus producing a temporary pressure increase therein which causes a slug of a cleaning liquid from the cleaning liquid source to be formed and forwarded through the milk transport line, and
 a control system configured to control the operation of the injector, said milking arrangement being characterized in that, during a cleaning sequence, the control system is configured to control slug characteristics by controlling the vacuum level supplied by the vacuum system and/or the amount of gas introduced via the controllable injector.

According to one embodiment the vacuum system comprises a vacuum pump and a controllable valve configured to introduce gas into a line that connects the receiver with the vacuum pump, and the control system is configured to control the vacuum level supplied by the vacuum system by controlling at least one of the vacuum pump and the controllable valve.

According to one embodiment, the control system is configured to control slug characteristics by controlling the amount of gas per time unit introduced via the controllable injector.

According to one embodiment, the controllable injector presents a channel that has a controllable variable cross section, and the control system is configured to control said variable cross section of the channel for controlling the amount of gas per time unit introduced via the controllable injector. The cross-section is variable in a plurality of incremental steps between its fully open and fully closed positions. The control system may also be configured to control the time which the injector is open and introduces air into the milk transport line.

According to one embodiment, the slug characteristics controlled by the control system comprises at least one of slug velocity of an individual slug and length of an individual slug. A slug may be defined as column of fluid filling the entire cross section of a conduit of the milk transport line. Each slug has length which is only a fraction of the length of milk transport line.

According to one embodiment, the control system comprises a first control mode dedicated to a first cleaning sequence and a second control mode dedicated to a second cleaning sequence, and in the first control mode the characteristics of the generated slug differ from the characteristics of the slug generated in the second control mode. The control system is thus configured to adapt, and optimize, the slug characteristics with regard to the requirements of different cleaning sequences.

According to one embodiment, the first control mode uses a first cleaning liquid and the second control mode uses a second cleaning liquid. Typically, the chemical composition of the cleaning liquid may differ between different cleaning sequences. The temperature of the cleaning liquid may also be controlled by the control system and controlled to be different for different cleaning sequences.

According to one embodiment, the first cleaning sequence is a pre-rinsing sequence and the second cleaning sequence is a main cleaning sequence, and the slug generated by the first control mode has a higher average velocity through the milk transport line than the average velocity of the slug generated by the second control mode. Typically, the purposes of the pre-rinsing is to flush the milk transport line and to remove residues, and the main cleaning sequence relies on the contact time between the cleaning liquid and the milk transport line. Therefore, higher velocity of the slugs generated by the first mode is preferred.

According to one embodiment, the first cleaning sequence is a pre-rinsing sequence and the second cleaning sequence is a main cleaning sequence and the slug generated by the second control mode has a longer average length than the average length of the slug generated by the first control mode. A longer contact time between the cleaning liquid and the wall of the milk transport line is thus achieved in the second mode, which is preferred for the main cleaning sequence.

According to one embodiment, the vacuum level supplied by the vacuum system is higher in the first control mode than in the second control mode. Thus a higher velocity of the slug is achieved in the first control mode According to one embodiment, the milk transport line has a length of 100 meters or more and the injector is arranged in connection to an end of the milk transport line opposite to an end where the milk receiver is provided.

According to one embodiment, the vacuum pump is connected to the receiver to supply vacuum therein.

According to one embodiment, the injector is configured to introduce air of atmospheric pressure into the milk transport line.

According to one embodiment, the milking arrangement comprises a sensor arrangement configured to measure at least one parameter related to the slug characteristics, and the control system is configured to receive the at least one parameter measured by the sensor arrangement and on-basis thereof produce an indicator of the slug characteristics, and to control the vacuum level supplied by the vacuum system and/or the amount of gas introduced via the controllable injector on basis of the indicator. Thus, the information from the sensor arrangement is taken advantage of for the purpose of controlling the slug characteristics. According to one embodiment, the sensor arrangement comprises a first sensor arranged in the vicinity of the location at which a slug is generated in the milk transport line, preferably within 10 meters from that location, while a second sensor is arranged in the vicinity of the receiver, preferably with 10 meters from the receiver. The first and second sensors may thus be configured to measure an average velocity of the slug between the first and second sensors, on basis detected time of passage of a slug by the respective sensor and on basis of the distance between the first sensor and the second sensor.

According to one embodiment, the sensor arrangement comprises any one of a pressure sensor, an ultra sound sensor, an electromagnetic sensor, an optical sensor or an accelerometer.

According to one embodiment, the milking arrangement comprises at least one flow-meter configured to determine the amount of cleaning liquid present in the milk transport line, and the control system is configured to control the vacuum level supplied by the vacuum system and/or the amount of gas introduced via the controllable injector on basis of the amount of cleaning liquid determined by said at least one flow meter.

BRIEF DESCRIPTION OF THE DRAWING

FIG. 1 is a schematic representation of a milking arrangement according to the present invention.

DETAILED DESCRIPTION OF EMBODIMENTS

FIG. 1 shows a milking arrangement according to an embodiment of the invention. The milking arrangement comprises a milk transport line 1 and a plurality of milk stations 2 connected to the milk transport line 1. Each milk station 2 comprises milking equipment for the milking of an animal. The milk transport line 1 has a length of 100 meters or more.

The milking arrangement further comprises a receiver 3 connected to the milk transport line 1 and configured to receive milk transported from the milk stations 2 to the receiver 3 via the milk transport line 1.

There is also provided a vacuum system 4 configured to supply a vacuum in the milk transport line 1 via the receiver 3. The vacuum system 4 comprises a vacuum pump 5 and a controllable valve 6 configured to introduce gas, preferably atmospheric air, into a line that connects the receiver 3 with the vacuum pump 5. The vacuum supplied by the vacuum system may be controlled by controlling the effect of the vacuum pump 5 and/or the opening and closure of the controllable valve 6. The vacuum system 4 also comprises a sanitary trap 7 and a buffer tank 8, arranged in series, via which the vacuum pump 5 is connected to the receiver 3. The vacuum system 4 is used for supplying a vacuum to the milk transport line during milking. However, as will be described later, the vacuum system 4 will also be used for controlling a cleaning sequence.

A cleaning liquid source 9 is connected to the milk transport line 1. The cleaning liquid source 9 may comprise one or more containers in which cleaning liquid is contained, preferably cleaning liquid of different character, typically with different chemical composition and/or different temperature, for different cleaning sequences.

There is also provided a controllable injector 10 configured to introduce an amount of gas, preferably atmospheric air, into the milk transport line 1 thus producing a temporary pressure increase therein which causes a slug of a cleaning liquid from the cleaning liquid source 9 to be formed and forwarded through the milk transport line 1. The liquid source 9 is connected to the milk transport line in the vicinity of the injector 10 via tubing 11 and a controllable valve 12. The equipment of the milking stations 2 are also connectable in a way known per se to the liquid source 9 via the tubing 11 and controllable valves 13. Flow meters 14, 15, 16, 17 in connection to the injector 10 and in connection to the milk stations 2 are provided for measuring the flow of cleaning liquid that enters and occupies at least part of the milk transport line 1.

There is provided a pump 20 via which cleaning liquid is pumped from the receiver 3 to the cleaning liquid source 16. In the specific embodiment shown, the pump 20 is also configured to pump milk from the receiver to a milk tank 21 during milking. In the embodiment shown, the cleaning liquid pumped by said pump 20 is pumped to the liquid source 9 via a filter 22 and a heat exchanger 23 arranged between the pump 20 and the milk tank 21. A controllable valve 25 is provided for the purpose of directing the pumped cleaning liquid towards the cleaning liquid source 9 instead of towards the milk tank 21. During cleaning, said controllable valve 25 prevents flow of cleaning liquid into the milk tank 21.

The milking arrangement further comprises a control system 19 configured to control the operation of the injector 10, the vacuum pump 5 and the controllable valve 6 of the vacuum system 4. The control system 19 is configured to control the vacuum level supplied by the vacuum system 4 by controlling at least one of the vacuum pump 5 and the controllable valve 6. The control system is thereby configured to control the rpm of the vacuum pump 5 and the opening time of the controllable valve 6. A pressure sensor (not shown) may be provided in a line connecting the vacuum pump 5 with the receiver 3, and the control system 19 may be configured to control the vacuum system 4 on basis of input from said pressure sensor. The control system 19 is also configured to control slug characteristics by controlling the amount of gas per time unit introduced via the controllable injector 10. The controllable injector 10 presents a channel that has a controllable variable cross section, and the control system 19 is configured to control said variable cross section of the channel for controlling the amount of gas per time unit introduced via the controllable injector 10. The slug characteristics controlled by the control system 19 thereby comprises the slug velocity of an individual slug and the length of an individual slug.

The control system 19 is also configured to control the operation of the controllable valves 12, 13 via which the cleaning liquid from the cleaning liquid source 9 is allowed to enter the milk transport line 1 either via the injector 10 or via the milking equipment of the milk stations 2. The control system 19 is also configured to control the operation of the pump 20 via which cleaning liquid is pumped from the receiver 3 to the cleaning liquid source 9.

The control system 19 is here exemplified by a control unit which comprises a processor and a readable memory. Alternative embodiments, such as cloud-based solutions are of course also conceivable.

The control system 19 comprises a first control mode dedicated to a first cleaning sequence and a second control mode dedicated to a second cleaning sequence. In the first control mode the characteristics of the generated slug differ from the characteristics of the slug generated in the second control mode.

In the presented embodiment the first control mode uses a first cleaning liquid and the second control mode uses a second cleaning liquid.

The first cleaning sequence is a pre-rinsing sequence and the second cleaning sequence is a main cleaning sequence. The slug generated by the first control mode has a higher average velocity through the milk transport line 1 than the average velocity of the slug generated by the second control mode. The slug generated by the second control mode has a longer average length than the average length of the slug generated by the first control mode. The vacuum level supplied by the vacuum system 4 is higher in the first control mode than in the second control mode. A higher vacuum level is referred to as a lower pressure level.

An indicator of the slug characteristics as the slug enters the receiver 3 is measured by means of a 3D-accelerometer 27 provided on the outside of the receiver 3. The slug will generate a motion of the receiver which corresponds to the speed and length (mass) of the slug. This motion is registered by the accelerometer 27. The control system 19 comprises a readable memory, in which there is stored a look-up table with set values, each value representing a value of a slug characteristic. The control system is configured to compare the measurement of the accelerometer 27 with the set values in the look-up table and to determine that the slug characteristic, velocity and/or length, of a slug corresponds to the preset value closest to the value measured by the accelerometer. The correlation between the set values and the slug characteristics may have been determined in laboratory environment for a predetermined combination of receiver design, accelerometer design and accelerometer position on the receiver.

On basis of the knowledge of the slug characteristic, measures may be taken to control the milking arrangement, preferably to control the controllable injector and/or the vacuum system, for the purpose of achieving a requested slug characteristic. The control system may thereby be configured to execute an iterative process, typically a closed-loop process, in order to attain slug characteristics that correspond to slug characteristics requested for each respective cleaning sequence.

In the embodiment shown, the milking arrangement comprises a sensor arrangement, which comprises a first pressure sensor 26a arranged in the milk transport line at a first position and a second pressure sensor 26b arranged at a second positon at predetermined distance from the first position. The passage of a slug results in a change of pressure, which is measurable by the respective sensor 26a, 26b. On basis of a known distance between the pressure sensors 26a, 26b and the point of time at which the passage of a slug is detected by the respective sensor, the control system 19 is configured to determine the average velocity of the slug. The average length of the slug may also be determined on basis of the measurements of the pressure sensors 26a, 26b, for example as described in WO2017/091126. A first pressure sensor 26a is arranged in the vicinity of the location at which a slug is generated in the milk transport line, preferably within 10 meters from that location, while a second pressure sensor 26b is arranged in the vicinity of the receiver 3, preferably with 10 meters from the receiver 3. The first and second pressure sensors 26a, 26b may thus be configured to measure an average velocity of the slug between the first and second sensors, on basis detected time of passage of a slug by the respective sensor and on basis of the distance between the first and second sensor.

The pressure sensors 26a, 26b will give information about the slug characteristics at a predetermined location in the milk transport line 1, while the accelerometer 27 gives information about the slug characteristics in the receiver 3. The control system 19 may be configured to combine the information in any suitable way in order to control the injector 10 or the vacuum system 4.

The control system 19 is also configured to control the vacuum level supplied by the vacuum system 4 and/or the amount of gas introduced via the controllable injector 10 on basis of the amount of cleaning liquid determined by the flow meters 14-17.

The invention claimed is:

1. A milking arrangement, comprising:
   a milk transport line (1);
   a plurality of milk stations (2) connected to the milk transport line (1);
   a receiver (3) connected to the milk transport line (1) and configured to receive milk transported from the milk stations (2) to the receiver (3) via the milk transport line (1);
   a vacuum system (4) configured to supply a vacuum in the milk transport line (1) via the receiver (3);
   a cleaning liquid source (9) connected to the milk transport line (1);
   a controllable injector (10) configured to introduce an amount of gas into the milk transport line (1) that produces a pressure increase in the milk transport line (1) that causes a slug of a cleaning liquid from the cleaning liquid source (9) to be formed and forwarded through the milk transport line (1); and
   a control system (19) configured to control an operation of the injector (10),
   wherein the control system is configured to, during a cleaning sequence, control slug characteristics by controlling a vacuum level supplied by the vacuum system (4) and/or the amount of gas introduced via the injector (10), the slug characteristics comprising at least one of a slug velocity of an individual slug, and a length of an individual slug,
   wherein the control system (19) is configured to operate in a first control mode dedicated to a first cleaning sequence, and in a second control mode dedicated to a second cleaning sequence, and
   wherein in the first control mode the characteristics of the generated slug differ from the characteristics of the slug generated in the second control mode.

2. The milking arrangement according to claim 1,
   wherein the vacuum system (4) comprises a vacuum pump (5) and a controllable valve (6) configured to introduce gas into a line that connects the receiver (3) with the vacuum pump (5), and
   wherein the control system (19) is further configured to control the vacuum level supplied by the vacuum system by controlling the vacuum pump (5) and the controllable valve (6).

3. The milking arrangement according to claim 1, wherein the control system (19) is configured to control slug characteristics by controlling the amount of gas per time unit introduced via the injector (10).

4. The milking arrangement according to claim 1,
   wherein the controllable injector (10) presents a channel that has a controllable variable cross section, and
   wherein the control system (19) is further configured to control said variable cross section of the channel for controlling the amount of gas per time unit introduced via the controllable injector (10).

5. The milking arrangement according to claim 1, wherein the first control mode uses a first cleaning liquid and the second control mode uses a second cleaning liquid.

6. The milking arrangement according to claim 5,
   wherein the first cleaning sequence is a pre-rinsing sequence and the second cleaning sequence is a main cleaning sequence, and
   wherein the slug generated by the first control mode has a higher average velocity through the milk transport line (1) than an average velocity of the slug generated by the second control mode.

7. The milking arrangement according to claim 5, wherein the slug generated by the second control mode has a longer average length than an average length of the slug generated by the first control mode.

8. The milking arrangement according to claim 5, wherein the vacuum level supplied by the vacuum system (4) is higher in the first control mode than in the second control mode.

9. The milking arrangement according to claim 1,
   wherein the first cleaning sequence is a pre-rinsing sequence and the second cleaning sequence is a main cleaning sequence, and
   wherein the slug generated by the first control mode has a higher average velocity through the milk transport line (1) than an average velocity of the slug generated by the second control mode.

10. The milking arrangement according to claim 9, wherein the slug generated by the second control mode has a longer average length than an average length of the slug generated by the first control mode.

11. The milking arrangement according to claim 9, wherein the vacuum level supplied by the vacuum system (4) is higher in the first control mode than in the second control mode.

12. The milking arrangement according to claim 1, wherein the slug generated by the second control mode has a longer average length than an average length of the slug generated by the first control mode.

13. The milking arrangement according to claim 12, wherein the vacuum level supplied by the vacuum system (4) is higher in the first control mode than in the second control mode.

14. The milking arrangement according to claim 1, wherein the vacuum level supplied by the vacuum system (4) is higher in the first control mode than in the second control mode.

15. The milking arrangement according to claim 1,
   wherein the milk transport line (1) has a length of 100 meters or more, and
   wherein the injector (10) is arranged in connection to an end of the milk transport line (1) opposite to an end where the milk receiver (3) is located.

16. The milking arrangement according to claim 1, wherein the vacuum pump (5) is connected to the receiver (3) to supply vacuum therein.

17. The milking arrangement according to claim 1, wherein the injector (10) is configured to introduce air of atmospheric pressure into the milk transport line (1).

18. The milking arrangement according to claim 1, further comprising:
   a sensor arrangement configured to measure at least one parameter related to the slug characteristics,
   wherein the control system (19) is further configured
   to receive the at least one parameter measured by the sensor arrangement and produce an indicator of the slug characteristics based on the at least one measured parameter, and
   to control the vacuum level supplied by the vacuum system (4) and/or the amount of gas introduced via the controllable injector (10) based on the indicator.

19. The milking arrangement according to claim 18, wherein the sensor arrangement comprises any one selected from the group consisting of a pressure sensor, an ultra sound sensor, an electromagnetic sensor, an optical sensor and an accelerometer.

20. The milking arrangement according to claim 1, further comprising:
at least one flow-meter configured to determine an amount of cleaning liquid present in the milk transport line (1), wherein the control system (19) is further configured to control the vacuum level supplied by the vacuum system (4) and/or the amount of gas introduced via the controllable injector (10) based on the amount of cleaning liquid determined by said at least one flow meter.

* * * * *